(12) United States Patent
Dhuse et al.

(10) Patent No.: US 8,694,668 B2
(45) Date of Patent: Apr. 8, 2014

(54) STREAMING MEDIA SOFTWARE INTERFACE TO A DISPERSED DATA STORAGE NETWORK

(75) Inventors: Greg Dhuse, Chicago, IL (US); S. Christopher Gladwin, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 212 days.

(21) Appl. No.: 13/107,040

(22) Filed: May 13, 2011

(65) Prior Publication Data

US 2011/0219100 A1 Sep. 8, 2011

Related U.S. Application Data

(63) Continuation-in-part of application No. 12/218,594, filed on Jul. 16, 2008, now Pat. No. 7,962,641, which is a continuation-in-part of application No. 12/080,042, filed on Mar. 31, 2008, and a continuation-in-part of application No. 11/973,542, filed on Oct. 9, 2007, and a continuation-in-part of application No. 11/973,613, filed on Oct. 9, 2007, now Pat. No. 8,285,878, and a continuation-in-part of application No. 11/973,621, filed on Oct. 9, 2007, now Pat. No. 7,904,475, and a continuation-in-part of application No. 11/973,622, filed on Oct. 9, 2007, now Pat. No. 8,171,101, and a continuation-in-part of application No. 11/403,391, filed on Apr. 13, 2006, now Pat. No. 7,546,427, and a continuation-in-part of application No. 11/404,071, filed on Apr. 13, 2006, now Pat. No. 7,574,579, and a continuation-in-part of application No. 11/403,684, filed on Apr. 13, 2006, now Pat. No. 7,574,570, and a continuation-in-part of application No. 11/241,555, filed on Sep. 30, 2005, now Pat. No. 7,953,937, and a continuation-in-part of application No. 12/218,200, filed on Jul. 14, 2008, now Pat. No. 8,209,363.

(51) Int. Cl.
*G06F 15/16* (2006.01)

(52) U.S. Cl.
USPC .......................................... 709/231; 709/201

(58) Field of Classification Search
USPC .................................................. 709/201, 231
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A * | 1/1996 | Rabin ........................... 714/762 |
| 5,774,643 A | 6/1998 | Lubbers et al. |

(Continued)

FOREIGN PATENT DOCUMENTS

WO 2007103533 A1 9/2007

OTHER PUBLICATIONS

European Patent Office; Extended European Search Report; Application No. 08837609.0; Jul. 12, 2012; 8 pgs.

(Continued)

*Primary Examiner* — Aaron Strange
(74) *Attorney, Agent, or Firm* — Garlick & Markison; Timothy W. Markison

(57) ABSTRACT

A client computer streams a digital media presentation from a dispersed data storage network including a plurality of slice servers. A dispersed data storage network access component streams data directly from the dispersed data storage network and passes data to a media player, also residing on the client computer.

8 Claims, 6 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 * | 9/2002 | Peters et al. ............. 711/112 |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,461 | B1 | 12/2006 | Kiselev et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 8,387,150 | B2 * | 2/2013 | Schnell ............. 726/26 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0144514 | A1 | 6/2005 | Ulrich et al. |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0143359 | A1 | 6/2007 | Uppala |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

European Patent Office; Extended European Search Report; Application No. 08837248.7; Jul. 19, 2012; 7 pgs.

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner

STREAMING MEDIA SOFTWARE INTERFACE TO A DISPERSED DATA STORAGE NETWORK

CROSS REFERENCE TO RELATED PATENTS

This patent application is claiming priority under 35 USC §120 as a continuation-in-part patent application of patent application entitled "STREAMING MEDIA SOFTWARE INTERFACE TO A DISPERSED DATA STORAGE NETWORK," having a filing date of Jul. 16, 2008, and a Ser. No. 12/218,594, now U.S. Pat. No. 7,962,647, issued on Jun. 14, 2011, which claims priority under 35 USC §120 as a continuation-in-part patent application of patent applications:
1. entitled "BLOCK BASED ACCESS TO A DISPERSED DATA STORAGE NETWORK," having a filing date of Oct. 9, 2007, and a Ser. No. 11/973,613, now U.S. Pat. No. 8,285,878, issued on Oct. 9, 2012, which is incorporated herein by reference;
2. entitled "SMART ACCESS TO A DISPERSED DATA STORAGE NETWORK," having a filing date of Oct. 9, 2007, and a Ser. No. 11/973,622, now U.S. Pat. No. 8,171,101, issued on May 1, 2012, which is incorporated herein by reference;
3. entitled "ENSURING DATA INTEGRITY ON A DISPERSED STORAGE NETWORK," having a filing date of Oct. 9, 2007, and a Ser. No. 11/973,542, which is incorporated herein by reference;
4. entitled "VIRTUALIZED STORAGE VAULTS ON A DISPERSED DATA STORAGE NETWORK," having a filing date of Oct. 9, 2007, and a Ser. No. 11/973,621, now U.S. Pat. No. 7,904,475, which is incorporated herein by reference;
5. entitled "SYSTEM, METHODS, AND APPARATUS FOR SUBDIVIDING DATA FOR STORAGE IN A DISPERSED DATA STORAGE GRID," having a filing date of Sep. 30, 2005, and a Ser. No. 11/241,555, now U.S. Pat. No. 7,953,937, issued on May 31, 2011, which is incorporated herein by reference;
6. entitled "BILLING SYSTEM FOR INFORMATION DISPERSAL SYSTEM," having a filing date of Apr. 13, 2006, and a Ser. No. 11/403,684, now U.S. Pat. No. 7,574,570, which is incorporated herein by reference;
7. entitled "METADATA MANAGEMENT SYSTEM FOR AN INFORMATION DISPERSED STORAGE SYSTEM," having a filing date of Apr. 13, 2006, and a Ser. No. 11/404,071, now U.S. Pat. No. 7,574,579, which is incorporated herein by reference;
8. entitled "SYSTEM FOR REBUILDING DISPERSED DATA," having a filing date of Apr. 13, 2006, and a Ser. No. 11/403,391, now U.S. Pat. No. 7,546,427, which is incorporated herein by reference;
9. entitled "REBUILDING DATA ON A DISPERSED STORAGE NETWORK," having a filing date of Mar. 31, 2008, and a Ser. No. 12/080,042, which is incorporated herein by reference; and
10. entitled "FILE SYSTEM ADAPTED FOR USE WITH A DISPERSED DATA STORAGE NETWORK," having a filing date of Jul. 14, 2008, and a Ser. No. 12/218,200, now U.S. Pat. No. 8,209,363, issued on Jun. 26, 2012, which is incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for interfacing a media player application to a dispersed data storage network.

2. Description of Prior Art

Dispersed data storage networks ("DDSNs") store data as an arbitrary number of data slices, generally with each data slice being stored on a separate slice server. Before a collection of data is stored it is segmented into a number of data segments, which may be of fixed or variable sizes. Each data segment is then sliced into a predetermined arbitrary number of data slices. Each data slice will generally contain minimal or no usable information by itself, but instead, must be combined with other data slices to reconstruct a usable data segment. DDSNs offer a number of advantages over traditional storage solutions including greater security and reliability.

Prior art DDSN systems, such as those offered by Cleversafe, Inc. of Chicago, Ill., have generally used an access computer, sometimes referred to as a Grid Access Computer or an Accesser™. The access computer is generally a high-performance server adapted to provide DDSN access to a large number of clients, such as an office of 20 or more users. Generally, the access computer does not have to be specified to handle the worst case scenario of each client computer accessing a maximum amount of data from the DDSN simultaneously, as office use often comes in bursts as a file is read or written. However, some types of usage, such as streaming media, require a continuous stream of data.

Streaming digital media is well known in the art, with Adobe Flash, Windows Media Audio and Video, and QuickTime being well known examples. Streaming media is generally served to clients by a streaming media server, which is specified to handle some number of simultaneous streams. Media serving platforms use a number of techniques to share streams across multiple streaming media servers, such as round-robin allocation. Prior art media serving platforms have not made use of DDSNs, and instead, have utilized individual or shared Redundant Array of Independent Drives ("RAID") or Storage Area Networks ("SAN").

One technique used by media providers to improve reliability and quality of service for streaming digital media presentations is the use of Content Delivery Networks ("CDNs"). A CDN is a network of computers that cooperate to deliver content to users. Generally, content is replicated among servers on an as needed basis, so that a server with the most desirable performance characteristics can serve content to a particular client. Often, content is replicated to the network so that it is available from a number of geographic locations, based on the assumption that a server located geographically close to a particular client will provide a better quality of service connection, if all else is equal.

A particular digital media stream will usually provide a specific quality. For example, a digital media presentation may be encoded at 720 pixels by 480 pixels, at 30 frames with second, with audio provided as 64 kilobits per second MP3. If quality levels are desired to serve users with less modern hardware or slower network connections, different media presentations will be encoded at the desired quality levels. Certain streaming media technologies allow a player to scale the frame rate of streamed video by skipping frames. This may result in "jerky" video, but will still allow a viewer to view the presentation.

More recent advances in encoding technology allow a single presentation to scale across a number of quality levels. For example, Flexible Block Wavelet encoding allows a streaming media presentation to scale across an arbitrary number of resolutions based on the bandwidth available to a particular client, and the ability of the client to process data.

OBJECTS OF THE INVENTION

Accordingly, it is an object of this invention to provide a system, apparatus, and method for accessing streaming digital media stored by a DDSN.

Another object of the invention is to provide a system, apparatus, and method for accessing streaming digital media stored by a DDSN in a cross-platform manner.

Another object of the invention is to provide a system, apparatus, and method for implementing a high-performance streaming digital media player plugin to access streaming digital media stored by a DDSN.

Another object of the invention is to provide a system, apparatus, and method for accessing streaming digital media stored by a DDSN from a client computer as opposed to from an access computer.

Another object of the invention is to provide a system, apparatus, and method for accessing streaming digital media stored by a DDSN from a client computer that is resilient to interruptions of network service disabling a portion of the DDSN.

Another object of the invention is to provide a system, apparatus, and method for accessing streaming digital media stored by a DDSN so that the quality of the presentation scales with the robustness of the DDSN.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a system for streaming a digital media presentation to a client computer from a dispersed data storage network. The dispersed data storage network includes a plurality of slice servers each of which may be located in a separate facility. The digital media presentation is broken into a plurality of data segments, and each data segment may only be reconstructed by combining data slices from more than one of the plurality of slice servers. Within the system, a client computer, such as a personal computer or a cellular telephone, is coupled to a network with access to the dispersed data storage network. A dispersed data storage network access component reads data segments from the dispersed data storage network and passes them to a media player operating on the client computer, which presents the streamed digital media presentation to a user.

In one embodiment, both the media player and the dispersed data storage network access component are implemented using a cross platform technology. Where this is not possible, the dispersed data storage network access component may be implemented as a cross platform component and interfaced to the media player with a plugin. The plugin may interface with the dispersed data storage network access component using a socket or Java Native Interface. Alternatively, the dispersed data storage network component may be implemented as a native component and interfaced to the plugin using static or dynamic linking.

In a further embodiment, the streamed digital media presentation may be encoded using a scalable technology, so that as slice servers become unavailable due to network outages or other reasons, the quality of the streamed digital media presentation degrades, but is otherwise still accessible.

BRIEF DESCRIPTION OF THE SEVERAL VIEWS OF THE DRAWING(S)

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which: FIG. 1 is a network diagram of a streaming media server streaming data from a dispersed data storage network through an access computer to a client computer;

Figure 5:
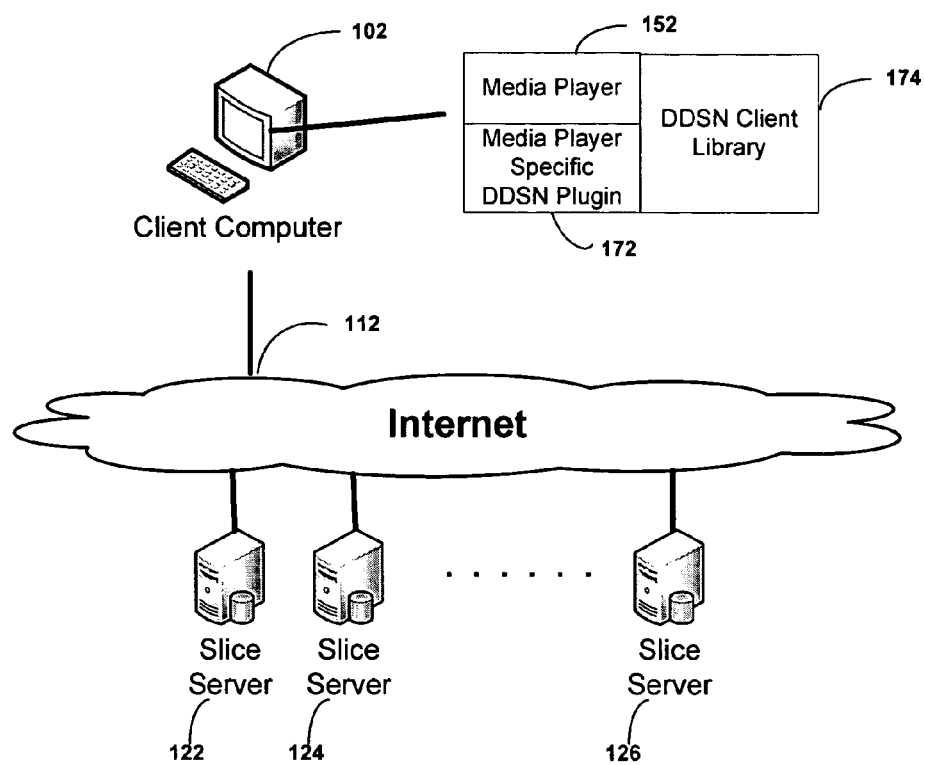
Figure 6:
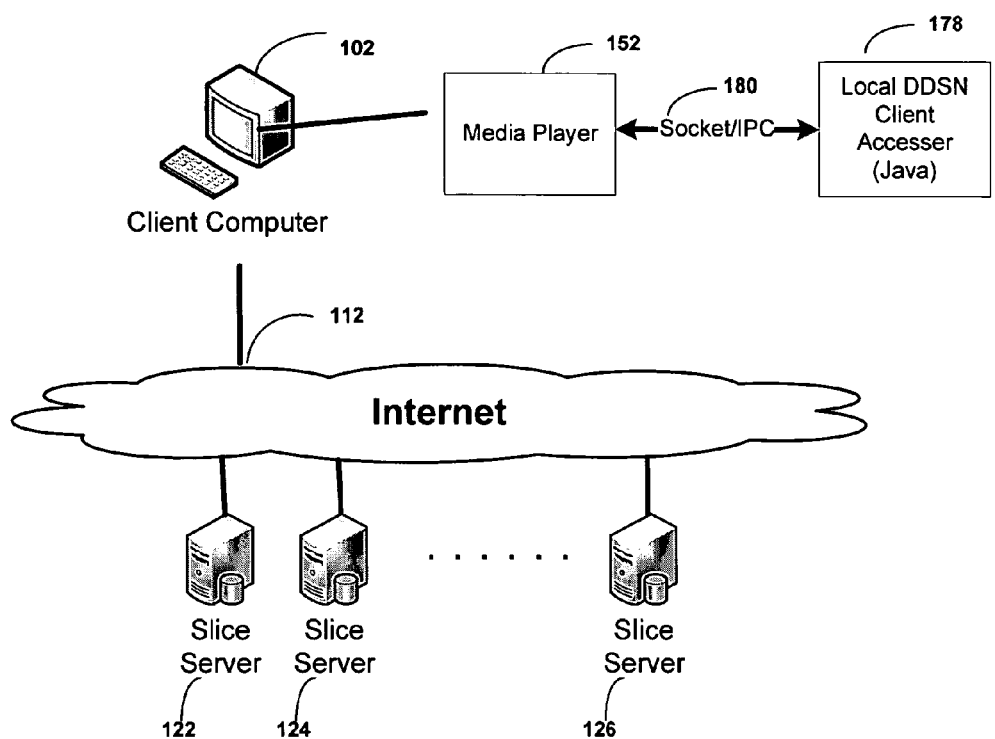

FIG. 5 is a network diagram of a client computer accessing digital media stored on a DDSN using a proprietary player with a media player specific plugin along with a DDSN client library especially suited to the specific platform on which the media player is running; and FIG. 6 is a network diagram of a client computer accessing digital media stored on a DDSN using a media player communicating with a local DDSN server using a socket or other form of inter-process communication.

DETAILED DESCRIPTION OF THE INVENTION

Figure 1:
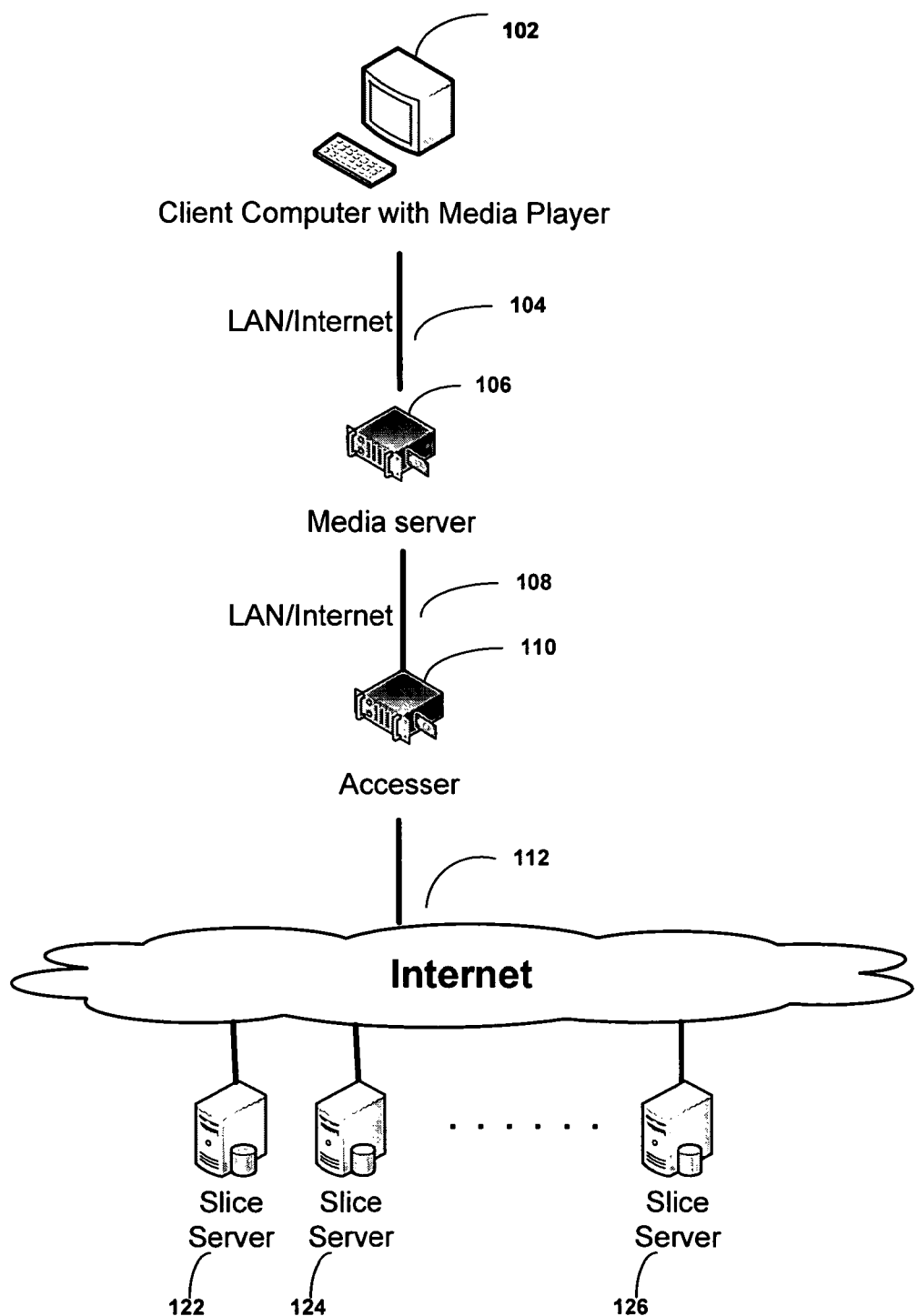

Turning to the Figures, and to FIG. 1 in particular, a client computer accessing a streaming media presentation is depicted. This architecture represents the simplest way to serve streaming digital media from a DDSN to a client computer 102 using any type of media player. The client computer 102 is coupled to a LAN or the Internet 104 using any type of network technology, such as an Ethernet port or a Wireless Network port. A media server 106 contains stream definitions for one or more streaming media presentations. The media server is coupled to a LAN or the Internet 108 using any type of network technology. It should be noted that network 104 and network 108 could be the same network or a different network. The media server 106 accesses streaming digital media through an access computer 110 from a plurality of slice servers 122,124,126 coupled to the Internet or some other type of Wide Area Network 112. Access computer 110, such as those available from Cleversafe, Inc., present the DDSN to the streaming media server 106 as a local or networked file system, so no interface software would be required for the streaming media server 106. An example of a refinement that is not depicted would be to integrate the media server 106 with the access computer 110. This would potentially allow for better performance, as network latency would not slow down communications between the media server and the access computer 110.

The approach of FIG. 1 would effectively support all prior art streaming media systems. Further, the implemented system would provide for resiliency to network outages across a portion of the DDSN, as access to an arbitrary predetermined number of slice servers 122,124,126 could be lost and the streaming presentation would still be available to be served to clients. In addition, many of the advantages of a content delivery network would be retained, as a DDSN generally includes geographically dispersed servers. Further, as outlined in U.S. patent application Ser. No. 11/973,622, entitled "SMART ACCESS TO A DISPERSED DATA STORAGE NETWORK," filed on Oct. 9, 2007, assigned to Cleversafe, Inc., and hereby incorporated by reference in its entirety, slice servers holding applicable content would be ranked by various performance criteria to ensure that the accessing client would receive a high quality of service without the replication of content required with a CDN. However, a network failure between the client computer 102 and the streaming media server 106 or between the streaming media server 106 and the access computer 110 would still disable access to the streaming media presentation.

Figure 2:
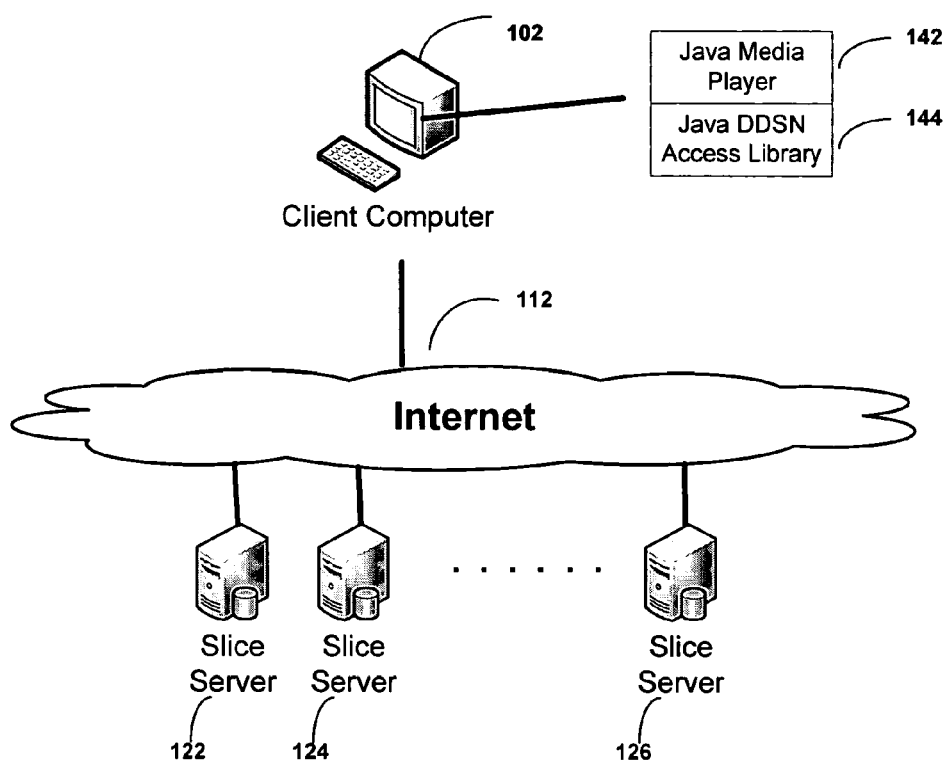
FIG. 2 is a network diagram of a client computer accessing digital media stored on a DDSN using a Cross Platform Media Player as well as a Cross Platform DDSN access library.

FIG. 2 depicts an alternate network architecture whereby a client computer 102 executing a cross platform media player 142 interfaces to a DDSN using a cross platform DDSN access library 144. Examples of suitable cross platform technologies include Sun's Java and Microsoft's .NET, as well as Tcl, Python, Perl, and Ruby. However, any suitable cross platform technology could be used. In this architecture, the client computer 102 directly accesses slice servers 122,124, 126 included within a DDSN through the Internet or another type of Wide Area Network 112. This architecture provides considerable resiliency to network outages across the DDSN. For example, if the DDSN is implemented using thirty two separate slice servers, of which twenty four are required to successfully assemble and utilize data, access could be lost to eight slice servers without any noticeable interruption in a streaming media presentation. Also, as each client computer 102 is responsible for streaming its own data, the expense of a separate access computer can be saved. In addition, this architecture could also utilize Cleversafe's smart access technology to rank slice servers by various criteria and thereby provide a high quality of service connection to the DDSN. Moreover, a system implementing this approach would provide for better scalability, as computation would be offloaded to individual client computers, and less bandwidth and equipment would be required overall, as the streaming server is eliminated.

Figure 3:
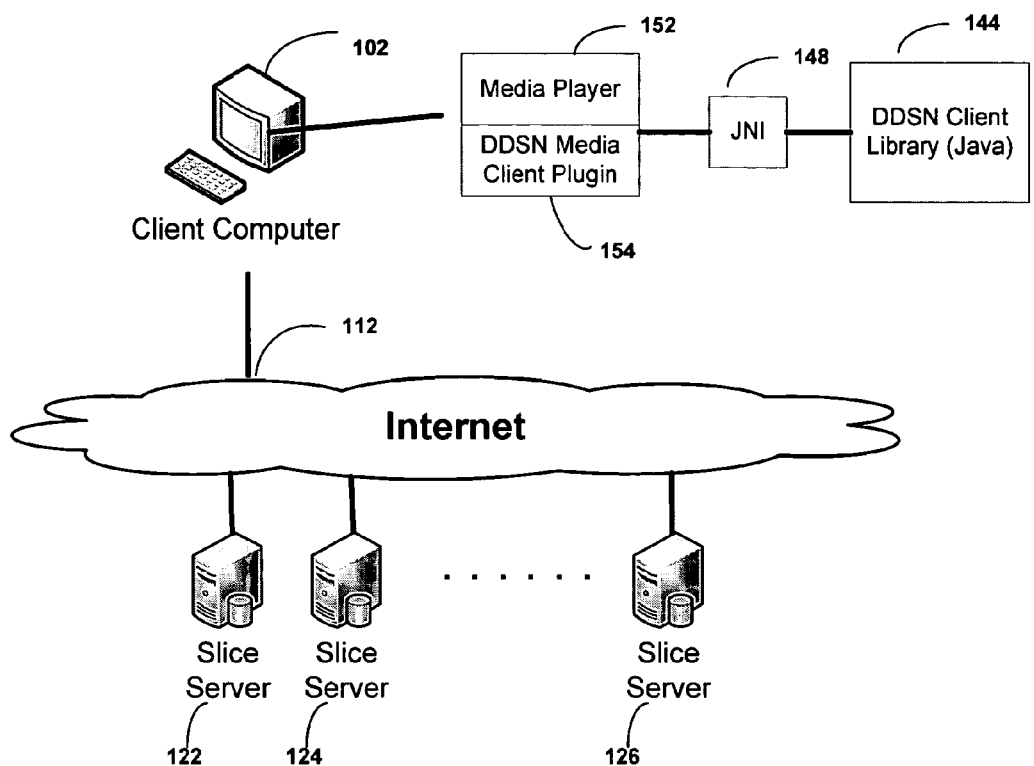
FIG. 3 is a network diagram of a client computer accessing digital media stored on a DDSN using a proprietary player linked to a Java DDSN access library using a proprietary format DDSN media client plugin and JNI.

FIG. 3 depicts another network architecture whereby a client computer 102 executing a media player specifically adapted for use on a particular type of system could interface to a DDSN using a client library implemented with Java 144. Examples of a proprietary media player 152 include, but are not limited to, Windows Media Player, Real Player, QuickTime, iTunes, and VLC media player. A media client plugin 154 interfaces with a proprietary player 152 using an application programming interface developed by the manufacturer of the proprietary player. The media client plugin 154 interfaces with a Java DDSN client library 144 using Java Native Interface 148. This implementation would provide similar advantages to the implementation of FIG. 2, with the additional advantage of working with the most popular media players presently available.

Figure 4:
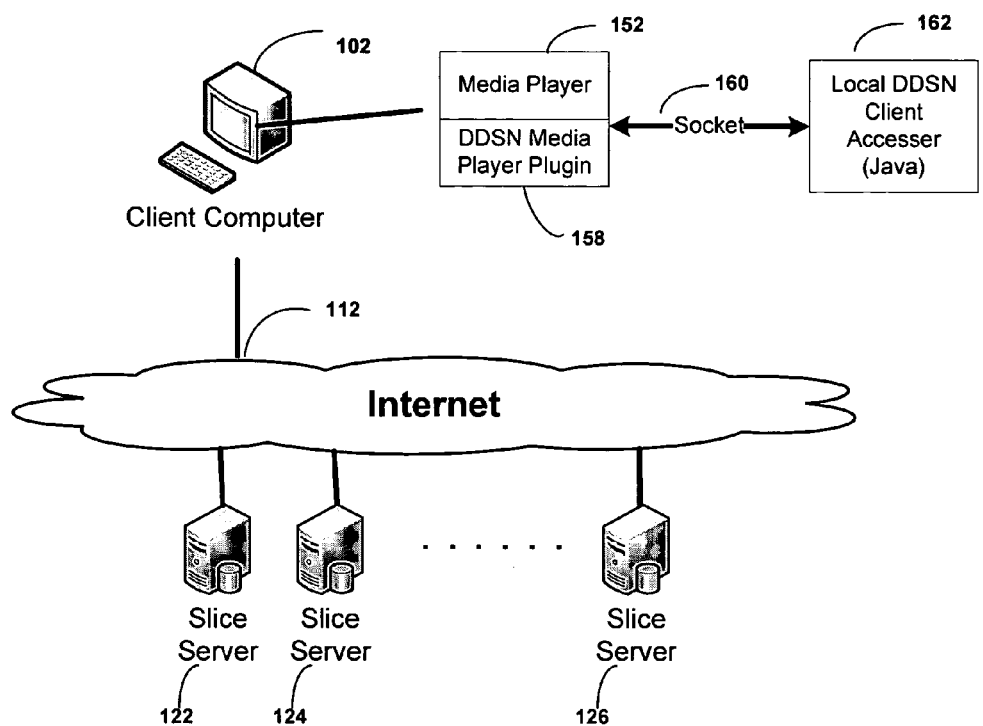
FIG. 4 is a network diagram of a client computer accessing digital media stored on a DDSN using a proprietary player linked to a Cross Platform DDSN access program using a DDSN media client plugin and a local socket.

FIG. 4 depicts another software interface between a DDSN client access program 162 and a proprietary media player 152. In this case a media client plugin 158 interfaces with a proprietary player 152 as in the embodiment depicted in FIG. 3. However, the media client plugin 158 interfaces with a cross platform DDSN client access program 162 using a socket 160 or some other form of inter-process communications ("IPC"), such as a memory mapped file or mailbox. This implementation provides similar advantages to the implementation of FIG. 3 without being tied to the use of Java and JNI, but instead, allowing for the use of any cross platform technology.

FIG. 5 depicts a platform specific interface between a media player 152 and a DDSN using a platform specific DDSN client library 174. In this implementation media player specific plugin 172 interfaces with a media player 152 and a platform specific DDSN client library 174. The interface could be through any form of static or dynamic linking between platform specific compiled software. Further, it should be understood that platform specific only refers to the fact that the referenced software is compiled for a specific platform, even though the code base could be more or less identical between different platforms. As in the implementations of FIGS. 2 through 4, the client computer and its media player directly stream digital media from slice servers 122, 124,126 through the Internet 112 or some other Wide Area Network. This implementation would provide all of the advantages of the implementation of FIG. 3, with the additional advantage of providing the best performance of any implementation. However, a different plugin 172 and a different DDSN client library 174 would be required for each supported platform.

FIG. 6 depicts a direct inter-process communication link, such as a socket, between any media player 152 and a local DDSN server 178. The media player 152 could be a platform specific media player or a cross platform media player. The local DDSN server 178 could also be a cross-platform DDSN server or a platform specific DDSN server. The specific media player 152 opens an inter-process communication link, such as a socket, to the local DDSN server 178, which then acts as a relay to pull content from slice servers 122,124,126 through the Internet or some other Wide Area Network. As all media players are able to stream content in certain protocols, such as HTTP, RTSP, or MMS, a local server can act as an intermediary by pulling data from the DDSN and passing it to the media player through an appropriate mechanism. This implementation provides an elegant solution to interfacing a media player to a DDSN while only providing a slight amount of additional overhead when compared to the solution of FIG. 5, and retaining all of the advantages of FIGS. 2-4.

FIGS. 2-6 all describe streaming media systems whereby a client directly accesses a DDSN for streaming media. As described, one advantage of this architecture is resiliency to potentially large scale network outages. Another potential advantage requires a change in the streaming media technology itself. When combined with a scalable streaming media technology, such as Flexible Block Wavelets, an arbitrarily scalable and reliable streaming media system can be realized. For example, if a thirty two slice server DDSN is implemented, the system may serve streaming media presentations at a quality of 1920 pixels by 1080 pixels at 60 frames per second if twenty four or more slice servers can be accessed. However, if sixteen to twenty three slice servers can be accessed, the quality may be reduced to 1280 pixels by 1080 pixels at 30 frames per second. Further, if twelve to fifteen slice servers can be accessed the quality may be reduced to 1280 pixels by 720 pixels at 30 frames per second. Finally, if between eight and eleven slice servers may be accessed, the quality may be further reduced to 1024 pixels by 768 pixels at fifteen frames per second. It should be understood that a system could be tailored to provide any level of quality with any number of slice servers available. It should also be understood that, while the examples addressed the scaling of video quality, similar techniques could be used to scale the quality of audio.

In addition, the segmentation process employed by the DDSN can be adapted to provide better performance for streaming video. Specifically, the data segments including data from the beginning of the streaming media presentation can be encoded as smaller segments than those later in the streaming media presentation. This will allow a stream to begin presentation quicker.

It should be understood that while this invention has been explained in the context of a software operating on a personal computer system, it could be implemented on a variety of different platforms. For example, a wireless mobile unit, such as a cellular telephone, could implement any of the embodiments described by FIGS. 1-5. For example, a BREW compliant player could interface with a DDSN access library to stream digital media to a cellular telephone. All such systems would fall within the definition of client computer as used above. Furthermore, while the term streaming has been used throughout, it should also be understood that the disclosed invention could apply to a progressive download system equally well.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for execution by a computer, the method comprising:
   receiving a request to read streaming digital media from a digital dispersed storage network (DDSN), wherein the streaming digital media is encoded in accordance with a scalable streaming media technology to produce a scalable quality streaming digital media, wherein the scalable quality streaming digital media is divided into a plurality of data segments, wherein a data segment of the plurality of data segments is encoded into a set of data slices, and wherein the DDSN stores the scalable quality streaming digital media as a plurality of sets of data slices in slice servers; and
   for one of the plurality of data segments:
      determining a number of the slice servers that are available;
      determining a level of quality of the streaming digital media based on the number of available slice servers;
      determining a minimum number of data slices of a corresponding set of data slices based on the level of quality;
      requesting the minimum number of data slices;
      when the minimum number of data slices is received, decoding the minimum number of data slices to recover the one of the plurality of data segments to produce a recovered data segment; and
      sending the recovered data segment to a media player for presentation as a part of playback of the streaming digital media.

2. The method of claim 1, wherein the sending the recovered data segment comprises:
   sending the recovered data segment to an interface, wherein the interface converts platform of the recovered data segment from a DDSN platform to a media player platform.

3. The method of claim 1, wherein the sending the recovered data segment comprises:
   converting platform of the recovered data segment from a DDSN platform to a media player platform to produce a media platform data segment; and
   sending the media platform data segment to the media player.

4. The method of claim 1 further comprises:
   for another one of the plurality of data segments:
      requesting the minimum number of data slices of another corresponding set of data slices;
      when the minimum number of data slices of the other corresponding set of data slices is received, decoding the minimum number of data slices of the other corresponding set of data slices to recover the another one of the plurality of data segments to produce another recovered data segment; and
      sending the other recovered data segment to the media player for presentation as a part of playback of the streaming digital media.

5. A computer comprising:
   a network interface; and
   a central processing unit operably coupled to the network interface, wherein the central processing unit is operable to:
      receive a request to read streaming digital media from a digital dispersed storage network (DDSN), wherein the streaming digital media is encoded in accordance with a scalable streaming media technology to produce a scalable quality streaming digital media, wherein the scalable quality streaming digital media is divided into a plurality of data segments, wherein a data segment of the plurality of data segments is encoded into a set of data slices, and wherein the DDSN stores the scalable quality streaming digital media as a plurality of sets of data slices in slice servers; and
      for one of the plurality of data segments:
         determine a number of the slice servers that are available;
         determine a level of quality of the streaming digital media based on the number of available slice servers;
         determine a minimum number of data slices of a corresponding set of data slices based on the level of quality;
         request the minimum number of data slices;
         when the minimum number of data slices is received, decode the minimum number of data slices to recover the one of the plurality of data segments to produce a recovered data segment; and
         send the recovered data segment to a media player for presentation as a part of playback of the streaming digital media.

6. The computer of claim 5, wherein the central processing unit further functions to send the recovered data segment by:

sending the recovered data segment to an interface, wherein the interface converts platform of the recovered data segment from a DDSN platform to a media player platform.

7. The computer of claim 5, wherein the central processing unit further functions to send the recovered data segment by:
converting platform of the recovered data segment from a DDSN platform to a media player platform to produce a media platform data segment; and
sending the media platform data segment to the media player.

8. The computer of claim 5, wherein the central processing unit is further operable to:
for another one of the plurality of data segments:
request the minimum number of data slices of another corresponding set of data slices;
when the minimum number of data slices of the other corresponding set of data slices is received, decode the minimum number of data slices of the other corresponding set of data slices to recover the another one of the plurality of data segments to produce another recovered data segment; and
send the other recovered data segment to the media player for presentation as a part of playback of the streaming digital media.

* * * * *